No. 708,927. Patented Sept. 9, 1902.
A. SIEMENS.
DEVICE FOR CONNECTING THE ELECTRICAL GEAR OF ELECTRIC CARS.
(Application filed Mar. 24, 1902.)
(No Model.) 2 Sheets—Sheet 1.
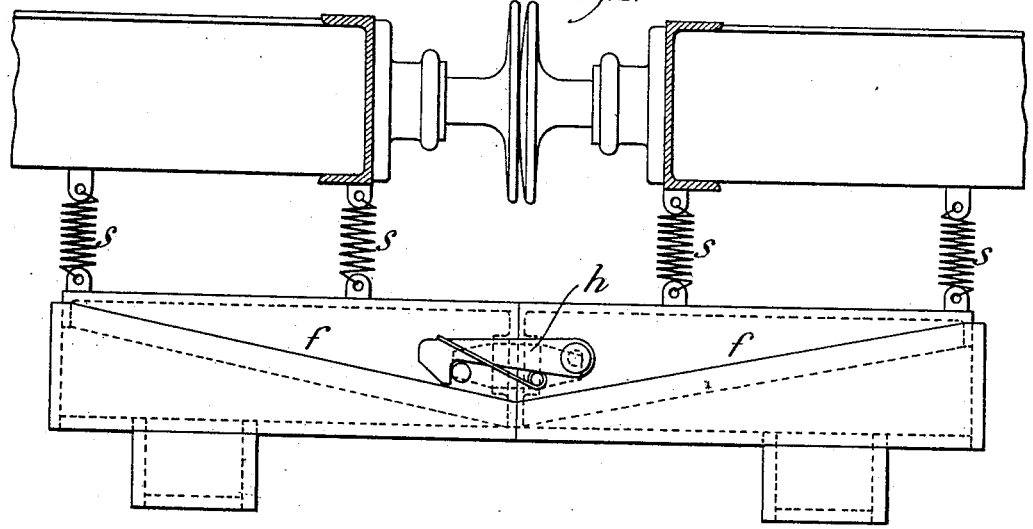
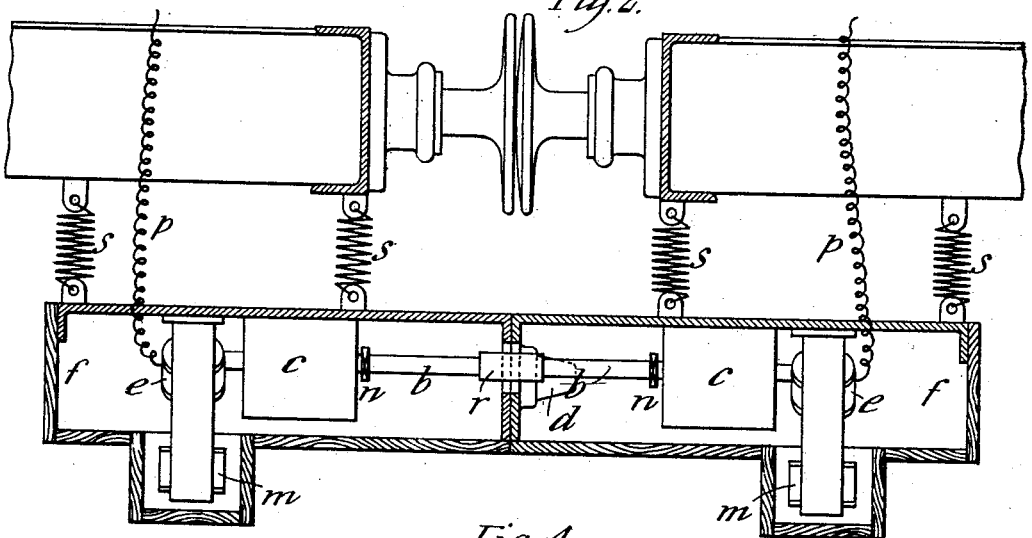
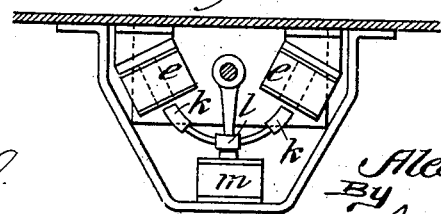
Witnesses:
James L. Norris, Jr.
E. D. Kesler.
Inventor
Alexander Siemens
By James L. Norris.
Atty.

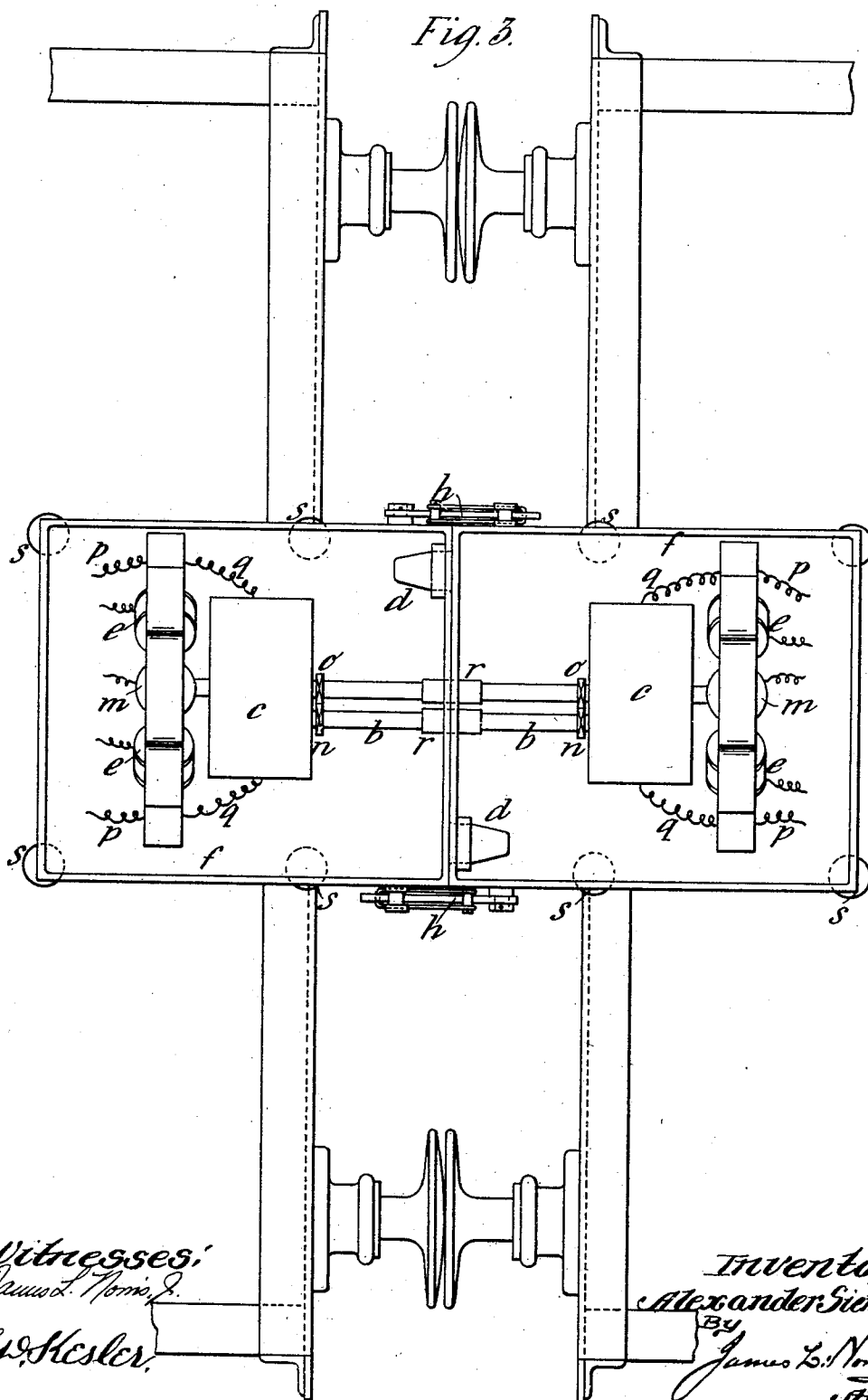

UNITED STATES PATENT OFFICE.

ALEXANDER SIEMENS, OF WESTOVER, MILFORD-ON-SEA, ENGLAND, ASSIGNOR TO SIEMENS BROTHERS & CO., LIMITED, OF WESTMINSTER, LONDON, ENGLAND.

DEVICE FOR CONNECTING THE ELECTRICAL GEAR OF ELECTRIC CARS.

SPECIFICATION forming part of Letters Patent No. 708,927, dated September 9, 1902.

Application filed March 24, 1902. Serial No. 99,749. (No model.)

*To all whom it may concern:*

Be it known that I, ALEXANDER SIEMENS, a citizen of England, residing at Westover, Milford-on-Sea, in the county of Hants, England, have invented a certain new and useful Device for Connecting the Electrical Gear of Electrical Cars, (for which application has been made for a patent in Great Britain, dated August 28, 1901, No. 17,256,) of which the following is a specification.

When several electrically-propelled cars are coupled together to form a train, it is necessary to connect the controlling mechanism of each car to the next, so that all the controlling operations performed on one—say, the front car—shall be exactly repeated on all the cars of the train. In order that this may be carried out, the shaft of a commutator or relay on the one car has to be connected with a corresponding shaft on the next car by a connection that will allow for the relative movements of both cars. This invention relates to means of making this connection in such a way that the movements of the one shaft follow exactly those of the other. For this purpose I connect the cars as I shall describe, referring to the accompanying drawings.

Figure 1 is a side elevation, Fig. 2 is a longitudinal section, and Fig. 3 is a plan, showing the end parts of two cars connected according to my invention. Fig. 4 is an end view of one of the relays employed.

From each car I suspend by springs $s$ a frame $f$, these two frames meeting when the cars are brought together and fitting truly against each other, being guided by a dowel $d$, projecting from near the one side of each, fitting into a corresponding hole near the other side of the other frame. Each frame has also on its one side a pivoted and spring-urged latch $h$, which rides over and engages a pin projecting from the side of the other, the two frames being thus locked together to form one frame suspended freely from the cars. In each frame is mounted in suitable bearings a cylindrical controller $c$, which can be moved into any one of three positions by means of a relay of known kind. (Shown in Fig. 4.) This relay, which in itself forms no part of my present invention, has an electromagnet $m$ and two solenoid-coils $e$, and on the shaft of the controller $c$ is fixed an arm carrying an armature $l$ and two iron cores $k$. When the magnet $m$ is energized, this arm is held in middle position, as shown in Fig. 4; but when either of the solenoids $e$ is energized the magnet $m$ being no longer excited the one or the other of the cores $k$ is drawn into its solenoid, the controller $c$ being then partly turned in the one direction or the other. The energizing of the magnet and solenoids is effected by electric currents transmitted from the one car or the other by flexible conductors $p$, which are accompanied by the conductors $q$, leading to and from the controller $c$. As in making up a train either car may have either of its ends turned toward the other, the axes of the controllers and relays are not in the center lines of the frames, but a little to the one side of the center, and at the same distance on the other side of the center are mounted two short shafts $b$, carrying toothed pinions $n$, which gear with equal pinions $o$ on the shafts of the controllers. The two controller-shafts, as well as the shafts $b$, are connected in the middle by couplings $r$ of any suitable kind. When the cars are connected, as shown in Fig. 3, the shafts $b$ revolve idly, the shaft of the one controller being coupled directly to the shaft of the other, so that when the one controller is partly turned by its relay the other controller is turned to the same extent and in the same direction. If, however, one of the cars—say the left-hand car—has its other end connected to the same end of the right-hand car, then the shaft of its controller would be coupled to the short shaft $b$ of the right-hand car and then the controller of the left-hand car would be turned through the pinions $n$ $o$ by that of the right-hand car, but in the opposite direction. This reversal, however, is necessary, owing to the reversal of the car in order that the controller on the reversed car may be turned in the proper directions for its action.

Having thus described the nature of this invention and the best means I know of carrying the same into practical effect, I claim—

A device for connecting the electrical gear of electrical cars, consisting of frames each carrying a controller and relay provided with flexible conductors, said frames suspended from the ends of each car, means for connecting the adjacent frames of two cars together, and means for suitably coupling the shafts of the controllers together, substantially as herein shown and described.

In testimony whereof I have hereunto set my hand in presence of two subscribing witnesses.

ALEXANDER SIEMENS.

Witnesses:
J. J. EASTON,
GEORGE H. HUME.